Sept. 10, 1929.　　　　　J. L. MRAZ　　　　　1,727,896
APPARATUS FOR MAKING TUBULAR JOINTS
Original Filed April 2, 1927　　2 Sheets-Sheet 1
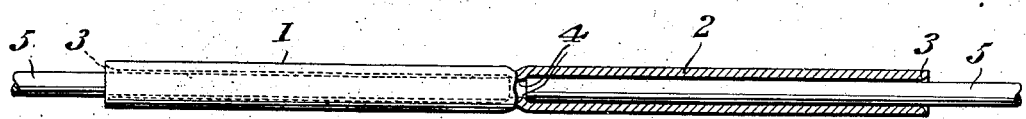
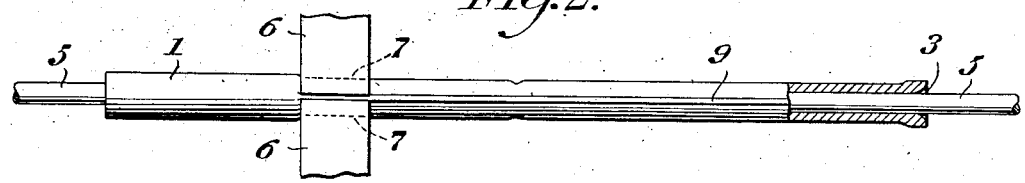
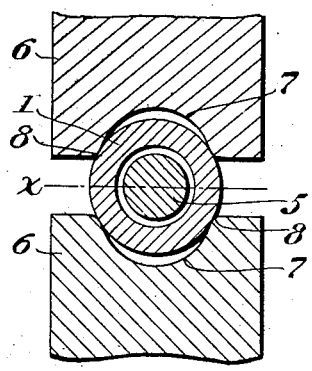 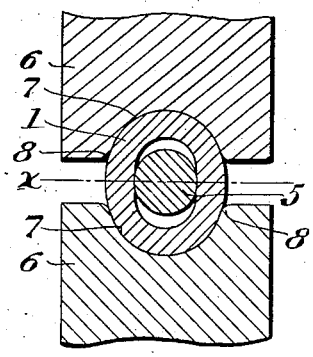 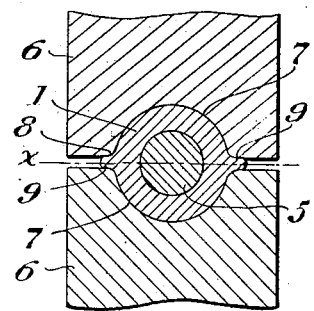
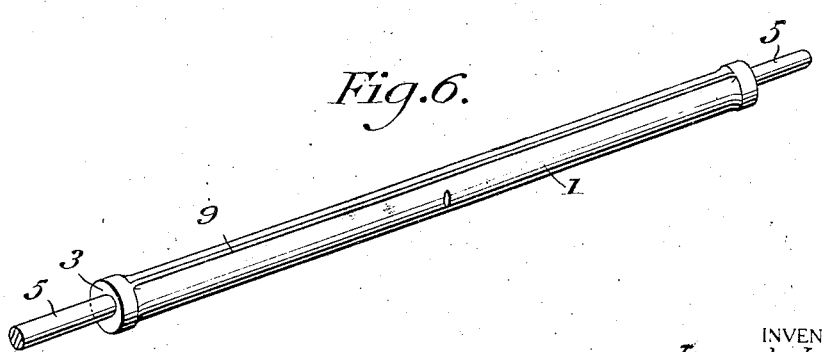
INVENTOR
*Joseph L. Mraz.*
BY
ATTORNEYS Sept. 10, 1929.                J. L. MRAZ                1,727,896
                  APPARATUS FOR MAKING TUBULAR JOINTS
               Original Filed April 2, 1927    2 Sheets-Sheet 2
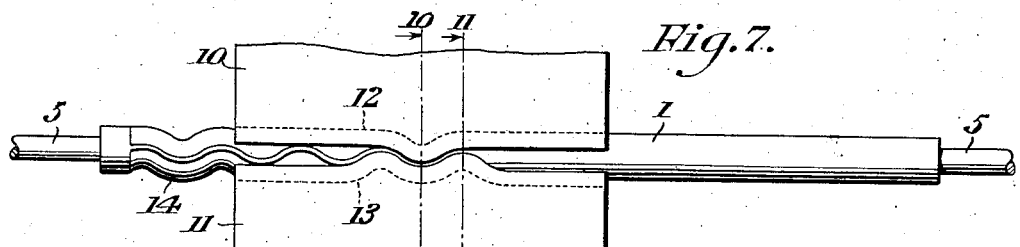
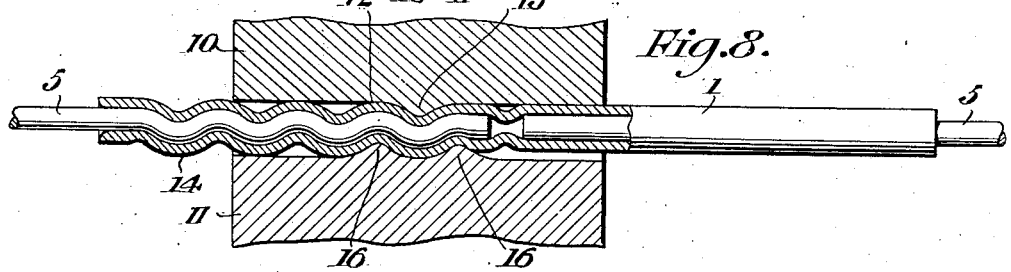
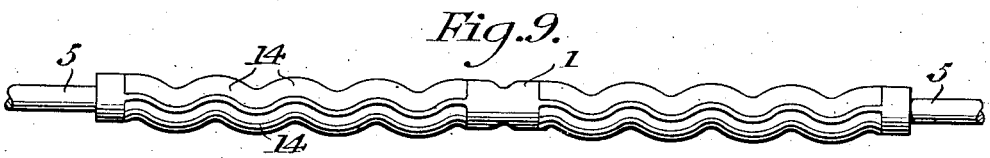
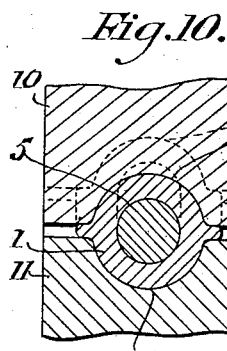 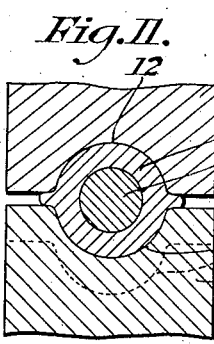 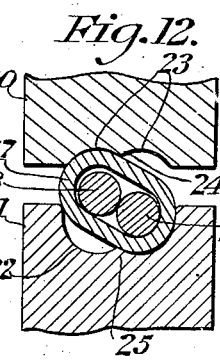 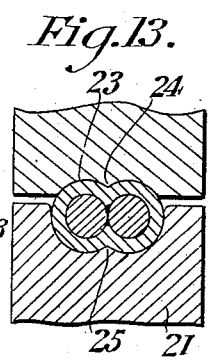
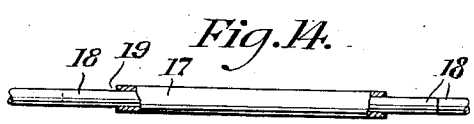
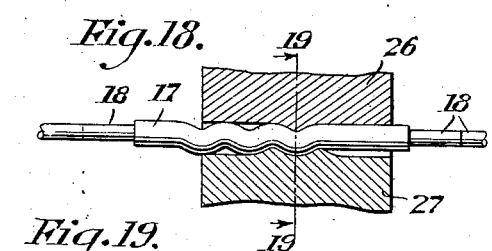
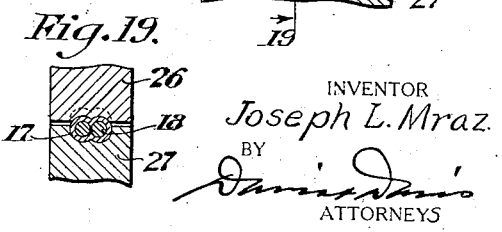
INVENTOR
Joseph L. Mraz.
BY
ATTORNEYS Patented Sept. 10, 1929.

1,727,896

UNITED STATES PATENT OFFICE.

JOSEPH L. MRAZ, OF WATERBURY, CONNECTICUT.

APPARATUS FOR MAKING TUBULAR JOINTS.

Original application filed April 2, 1927, Serial No. 180,390. Divided and this application filed February 16, 1928. Serial No. 254,777.

This application is a division of my application for patent filed April 2, 1927, Serial No. 180,390.

An important object of the present invention is to provide a simple apparatus for making a strong joint between the ends of two electric conductors without the use of solder.

Another object of the invention is to provide a simple and efficient apparatus for making a close joint of great tensile strength between a tubular metal structure and a wire, stranded cable, rod or the like.

Other objects of the invention will appear hereinafter.

In the drawings:

Fig. 1 is a side view, partly in section, of the assembled joint elements prior to the compression thereof;

Fig. 2 a side view, partly in section, showing the operation of compressing the joint sleeve;

Figs. 3, 4 and 5 enlarged cross-sectional views showing different stages of the compressing operation;

Fig. 6 a perspective view of the finished joint;

Figs. 7 and 8 a side view and a longitudinal section respectively showing the operation of forming another form of joint;

Fig. 9 a side view of the finished joint;

Fig. 10 a cross section taken on the line 10—10 of Fig. 7;

Fig. 11 a similar view taken on the line 11—11 of Fig. 7;

Figs. 12 and 13 cross-sectional views showing the manner of forming a joint between two overlapped wires;

Fig. 14 a side view of said lap joint partly broken away;

Fig. 15 a plan view thereof;

Fig. 16 a side view of another form of lap joint;

Fig. 17 a plan view thereof;

Fig. 18 a longitudinal section upon an enlarged scale showing the operation of forming the joint shown in Figs. 16 and 17; and Fig. 19 a cross section taken on the line 19—19 of Fig. 18.

To form an improved joint between two electric wires, I first provide a tubular connector sleeve 1 of cylindrical form. This sleeve is preferably formed of copper although any suitable material may be used. The bore or passage 2 through the sleeve is slightly larger in diameter than the wires which are to be connected together, and the ends of said bore flare outwardly as at 3 to form bell-shaped entrances for the wires. Midway its ends the sleeve is indented at opposite sides to form two opposed abutments 4 extending into the passage 2.

The ends of the circuit wires 5 are inserted into the opposite ends of the passage 2 and are thrust through the passage until they bottom against the abutments 4 as shown in Fig. 1. The tube is next compressed about the wires in a manner to intimately and permanently unite it with them. This compression is performed by two die members 6 which are engaged with opposite sides of the tube as shown in Fig. 2. The cross-sectional form of these die members is shown in Figs. 3, 4 and 5. Each member is formed at its working face with a straight groove 7. The surface of this groove is substantially semi-cylindrical and in cross section it describes an arc slightly less than a semi-circle. This arc is struck with a radius slightly less than the radius of the cross section of the cylindrical tube 1 which is to be operated upon by the die members. Therefore when the die members are brought into engagement with the cylindrical surface of the tube only the edges 8 of the grooves 7 will contact with the tube, as shown in Fig. 3. The edges 8 are rounded and their points of contact with the tube are spaced equally above and below the transverse center line "$x$" extending horizontally through the tube.

The die members are next pressed toward each other. The resultant transverse pressure transmitted to the tube by the die edges 8 as the members approach each other causes the tube to be compressed in substantially the direction of the line "$x$", and forces it tightly against the enclosed wire at diametrically opposite points thereof. This compression distorts the tube into an elliptical cross-sectional form, as shown in Fig. 4, and causes it to closely fit the die grooves 7. As the movement of the die members continues, therefore, the tube will be subjected to the pressure of the entire surfaces of the grooves and will be compressed in a direction substantially at right angles to the direction of the first compression and force the tube into contact with the wire around the entire circumference thereof. During the final portion of the die movement it will be observed that almost the entire cross section of the tube is confined between the surfaces of the die grooves 7 and the enclosed wire. The metal of the tube will, therefore, be subjected to a compression which will force it into intimate, permanent, binding contact with the entire circumference of the wire. During this final compression of the tube metal it is left free for a narrow space between the compressing die members to permit of a slight transverse deformation or "upsetting" of the metal outwardly in the direction of the line "x". This deformation takes the form of two narrow ribs 9 extending longitudinally along the tube. When the compression is completed the tube is again of cylindrical form but its diameter is now reduced. The pressure has molded the metal of the tube around the circumference of the wire. Heat is generated in the metal by the pressure and consequently when the tube cools it contracts into a still stronger binding engagement with the enclosed wire. The die members may be forced together either by sustained pressure or by blows.

The die members are shifted along the tube and a series of compressing operations are performed until substantially the entire length of the tube has been compressed. The end portions of the tube are, however, left uncompressed in order to avoid crushing the flared entrances 3. These flared surfaces are provided not only to facilitate the insertion of the wires but also to avoid sharp corners and permit the wires to bend without any biting action at the points where they emerge from the tube. When the wire and the tube have been united as described the tube becomes in effect a permanent, integral part of the wires and the electrical conductivity of the joint will be equal to that of a continuous wire. The conductivity cannot be reduced in any way. The joint is substantial and the sleeve is so intimately united with the wire as to entirely exclude moisture from the interior of the joint.

In Figs. 7, 8 and 10 I have illustrated another form of apparatus for forming a joint having a great tensile strength in addition to possessing all of the advantages of the straight joint just described. A tube of the form shown in Fig. 1 is used in forming this joint also and the wires 5 are inserted into said tube as shown in Fig. 1. I now employ die members 10 and 11 to operate upon the tube. These die members have substantially the same cross sectional form as the members 6 but differ from them in longitudinal section. The groove surfaces 12 and 13 of the die members 10 and 11 respectively are formed in longitudinal section to force a portion of the tube and the enclosed portion of the wire out of alinement with the longitudinal center line or axis of the joint and form a curved bend 14 therein. To accomplish this, one of the die members is formed upon its working face with a tube-flexing projection or hump 15 and the other member is formed with two tube-flexing projections or humps 16 equally spaced at opposite sides of a center line through the projection 15. The peaks of the projections 15 and 16 are rounded in side contour and the bases thereof are rounded to merge with the opposed die faces. The die members are thus formed to give a wave-like form to the bend evenly with the remainder of the tube.

Simultaneously with the bending operation the tube is compressed about the enclosed wire to give the joint the same cross sectional form as that of the previous joint, the bending humps of the die members and the adjacent groove surfaces being formed to accomplish this, as shown in Fig. 10. Outwardly of the bending humps the groove surfaces of the two die members extend longitudinally in parallel lines spaced apart sufficiently to avoid crushing adjacent portions of the tube during a bending and compressing operation. The performance of the compressing operation simultaneously with the bending of the tube is a very desirable feature. The compression of the tube prevents it from splitting under the bending stress, by ironing out the metal of the tube and maintaining the continuity of its outer surface. It also holds the tube in close contact with the entire enclosed surface of the wire as both are bent.

The die members are advanced along the tube to perform a series of these bending and compressing operations and form a series of the bends 14 at either side of the longitudinal center of the joint. Each bend merges with the next in the series so that the series presents a continuous, even, wave-like form. The degree to which the tube and wire are bent out of alinement with the joint axis will vary according to different requirements and according to the wire and tube sizes and the materials used. The die members are designed to give the desired depth and length to the bend. This wave-like joint positively anchors the wires to the connecting tube and possesses a greater tensile strength than the wire alone. It also excludes moisture from its interior as effectually as the straight joint. Both joints are formed entirely without solder. The manner of intimately uniting the inner surface of the tube continuously with the enclosed surface of the wire provides a closed joint of high electrical conductivity without the use of any cementing material. It costs little to prepare the sleeve for connection and requires very little equipment for making the joint. Another practical advantage is that it requires less skinning of the insulation from an insulated wire than in the case of an ordinary overlapped and soldered joint and needs less insulation to cover it when the connection is made.

In Figs. 12 to 15 I have shown the construction of a joint for connecting two overlapped wires. A straight elongated sleeve 17 is here used. This sleeve is sufficiently elongated or oblong in cross section to accommodate two wires 18 side by side. The ends of the passage through the sleeve are flared outwardly as at 19. The sleeve is compressed by means of two die members 20 and 21. The member 21 is formed with a relatively deep groove 22. The width of the groove is slightly less than the major width of the sleeve. The sleeve and its enclosed wires are placed diagonally within the groove 22 with one end of the cross section of the sleeve in the bottom of the groove and the other end projecting out of the groove as shown in Fig. 12. The die member 20 is formed with two shallow grooves 23 side by side and separated by a longitudinal rib 24. The member 21 is formed with a similar rib 25 at the bottom of the groove 22. One of the grooves 23 is engaged with the projecting portion of the diagonally disposed sleeve 17 and the die members are pressed together. This pressure will force the sleeve 17 entirely into the groove 22 and the sleeve will be laterally compressed between the opposite side walls of the groove and opposite sides of the sleeve will be forced into tight engagement with the enclosed wires. As the sleeve descends into the groove 22 the ribs 24 and 25 of the die members, by their engagement with the portions of the sleeve extending between the wires, prevent the sleeve from expanding at these points under the stress of the said lateral compression and force the metal of the sleeve inwardly between the wires. When the sleeve has been forced against the bottom of the groove as shown in Fig. 13 its cross section is almost entirely surrounded by the opposed concave die faces and a compression thereof will force the metal of the sleeve into intimate, binding engagement with the enclosed wires around substantially three-quarters of their circumference.

In Figs. 16 and 17 a modification of the lapped wire joint is shown. In this case the joint is compressed and formed with wave-like bends similar to those in the joint shown in Fig. 9 in order to give it greater tensile strength. The two die members 26 and 27 provided for this purpose are similar in form to those shown in Figs. 7 and 8 except that in cross section they correspond in form to the die members 20 and 21, as shown in Fig. 12.

What I claim is:

1. An apparatus for compressing a metal tube about a strand enclosed in the tube, comprising a pair of die members adapted to be relatively moved toward each other and formed to engage the tube, compress it transversely into contact with two opposite sides of the strand during the first part of the die movement and permit the tube to expand in a direction substantially at right angles to the direction of said compression, and next to compress the tube transversely around substantially its entire circumference as the die movement progresses and force the metal of the tube into intimate binding contact with the entire circumference of the strand.

2. An apparatus for compressing a metal tube about a strand enclosed in the tube, comprising a pair of die members adapted to be relatively moved toward each other and formed to engage the tube, compress it transversely into contact with two opposite sides of the strand during the first part of the die movement, and next to compress the tube transversely around substantially its entire circumference, as the die movement progresses and force the metal of the tube into intimate binding contact with substantially the entire circumference of the strand; and means carried by the die members to bend the compressed portion of the tube and the enclosed strand simultaneously with the performance of the compression.

3. An apparatus for compressing a metal tube about a strand enclosed within the tube, comprising a pair of opposed die members adapted to be relatively moved toward each other and each provided with a groove having rounded marginal edges to engage opposite sides of the tube when the latter is disposed between the die members, the two grooves, when the die members are brought together, forming a cavity of smaller cross sectional dimensions than the cross sectional dimensions of the tube to be compressed, whereby during the compressing operation the tube will be compressed by the rounded marginal edges of the grooves transversely of the direction of movement of the die members into contact with opposite sides of the strand during the first part of the die movement and will be then compressed in the direction of movement of the die members substantially at right angles to the first compression during the final compressing movement of the die members, the said die members during the final portion of the compressing operation forcing the tube into direct close binding contact with the strand around its entire circumference.

4. An apparatus for compressing a metal tube about a strand enclosed within the tube, comprising a pair of opposed die members adapted to be relatively moved toward each other and each provided with a groove having rounded marginal edges to engage opposite sides of the tube when the latter is disposed between the die members, the two grooves, when the die members are brought together, forming a cavity of smaller cross sectional dimensions than the cross sectional dimensions of the tube to be compressed, whereby during the compressing operation the tube will be compressed by the rounded marginal edges of the grooves transversely of the direction of movement of the die members into contact with opposite sides of the strand during the first part of the die movement and will be then compressed in the direction of movement of the die members substantially at right angles to the first compression during the final compressing movement of the die members, the said die members during the final portion of the compressing operation forcing the tube into direct close binding contact with the strand around its entire circumference; and means carried by the die members to bend the compressed portion of the tube and the enclosed strand simultaneously with the performance of the compression.

5. An apparatus for compressing a metal tube about a strand enclosed therein and interlocking it therewith to form a joint, comprising a pair of opposed die members adapted to be relatively moved toward each other and each provided with a groove in its working face to engage opposite sides of the tube when the latter is disposed between them, the two grooves forming a cavity of smaller cross-sectional dimensions than the cross-sectional dimensions of the tube to be compressed; a tube-flexing projection formed upon the working face of one of said die members, of hump-like form in side contour, curved at the peak and at the base longitudinally of the said groove and forming a wave-like curve in the groove; and a pair of tube-flexing projections formed upon the working face of the opposed die member, spaced apart longitudinally of the groove at opposite sides of a transverse plane through the center of the first projection and forming a wave-like curve in the groove to cooperate with the wave-like curve of the groove in the other die member, whereby the die members are adapted to form a wave-like bend in both the tube and the enclosed strand and to reduce the cross-section of the tube along said bend by compressing the tube about the strand.

6. An apparatus for compressing a metal tube about a strand enclosed therein and interlocking it therewith to form a joint, comprising a pair of opposed die members adapted to be relatively moved toward each other and each provided with a groove in its working face to engage opposite sides of the tube when the latter is disposed between them, the two grooves forming a cavity of smaller cross-sectional dimensions than the cross-sectional dimensions of the tube to be compressed; a tube-flexing projection formed upon the grooved working face of one of said die members, of hump-like form in side contour and curved at the peak and at the base longitudinally of the said groove to form a wave-like curve in the groove; a pair of tube-flexing projections formed upon the working face of the opposed die member, similar in form to said first projection and spaced apart longitudinally of the groove at opposite sides of a transverse plane through the center of the first projection to form a wave-like curve in the groove to cooperate with the wave-like portion of the groove in the other die member whereby the die members are adapted to form a wave-like bend in both the tube and the enclosed strand and to reduce the cross-section of the tube along said bend by compressing the tube about the strand, the opposed faces of the two die members extending straight outward at opposite sides of their respective projections in parallel directions.

7. An apparatus for compressing a metal tube about a pair of metal strands enclosed therein side by side to form a joint, comprising a pair of opposed die members adapted to be relatively moved toward each other to engage opposite sides of the tube when the latter is disposed therebetween and formed with opposed working faces concave to provide opposed longitudinally extending grooves for embracing the tube; a rib formed in one of said grooves and extending longitudinally along the center thereof; an opposed longitudinal central rib formed in the other groove, whereby the die members are adapted to compress the tube around and between the enclosed strands; and means carried by the die members to form a wave-like bend in the compressed portion of the tube and the enclosed strands simultaneously with the performance of the compression.

8. An apparatus for compressing a metal tube about a pair of strands enclosed therein and interlocking it therewith to form a joint, comprising a pair of opposed die members adapted to be relatively moved toward each other and each provided with a groove in its working face to engage opposite sides of the tube when the latter is disposed between them, the two grooves forming a cavity of smaller cross-sectional dimensions than the cross-sectional dimensions of the tube to be compressed; a tube-flexing projection formed upon the working face of one of said die members, of hump-like form in side contour and curved at the peak and at the base longitudinally of the said groove and forming a wave-like curve in the groove; a pair of tube-flexing projections formed upon the working face of the opposed die member, spaced apart longitudinally of the groove at opposite sides of a transverse plane through the center of the first projection and forming a wave-like curve in the groove to cooperate with the wave-like portion of the groove in the other die member; a rib formed in one of said grooves and extending longitudinally along the center thereof; and an opposed longitudinal central rib formed in the other groove, whereby the die members are adapted to form a wave-like bend in the tube and the enclosed strands and compress the tube around and between the strands.

9. An apparatus for compressing a metal tube about a strand enclosed in the tube, comprising a pair of die members adapted to be relatively moved toward each other to engage the tube disposed therebetween and provided with die faces forming opposed grooves to embrace the tube and having longitudinally spaced, staggered projections in said grooves, said die faces being adapted to transversely compress the tube, form a wave-like bend in the tube and enclosed strand, and mold the metal of the tube into intimate binding contact with the entire periphery of the strand along the length of said bend.

In testimony whereof I hereunto affix my signature.

JOSEPH L. MRAZ.